(12) United States Patent
Rockhold

(10) Patent No.: US 12,460,752 B2
(45) Date of Patent: Nov. 4, 2025

(54) TUBING COUPLER

(71) Applicant: Brandon Rockhold, Bennett, CO (US)

(72) Inventor: Brandon Rockhold, Bennett, CO (US)

( * ) Notice: Subject to any disclaimer, the term of this patent is extended or adjusted under 35 U.S.C. 154(b) by 0 days.

(21) Appl. No.: 18/736,876

(22) Filed: Jun. 7, 2024

(65) Prior Publication Data
US 2024/0318750 A1 Sep. 26, 2024

Related U.S. Application Data

(62) Division of application No. 17/831,567, filed on Jun. 3, 2022, now Pat. No. 12,031,646.

(60) Provisional application No. 63/196,287, filed on Jun. 3, 2021.

(51) Int. Cl.
*F16L 21/00* (2006.01)
*F16L 13/10* (2006.01)

(52) U.S. Cl.
CPC ........... *F16L 21/002* (2013.01); *F16L 13/103* (2013.01); *Y10T 29/49826* (2015.01)

(58) Field of Classification Search
CPC ........ F16L 13/103; F16L 21/002; F16L 25/12
USPC .............. 285/397, 334.2, 332; 403/292
See application file for complete search history.

(56) References Cited

U.S. PATENT DOCUMENTS 5,059,057 A * 10/1991 Graef .................... A61F 2/3607
403/292

* cited by examiner

*Primary Examiner* — Zachary T Dragicevich
(74) *Attorney, Agent, or Firm* — Hall Estill Law Firm

(57) ABSTRACT

A tubing coupler. The coupler includes a tubular body and a a stock body portion that is grooveless. The tubing coupler also includes a first engagement end with a first set of grooves disposed thereon to engage with an inside portion of a first piece of tubing. A method of making a customized part with the tubing coupler. The method includes securing at least a portion of the tubing coupler inside a first piece of carbon fiber tubing.

9 Claims, 5 Drawing Sheets

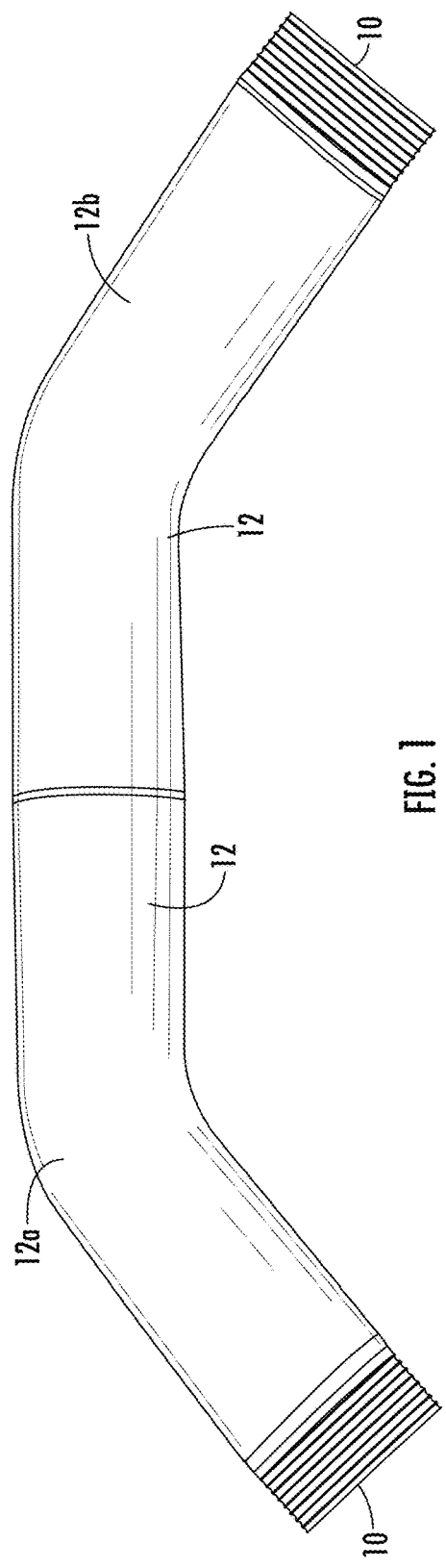
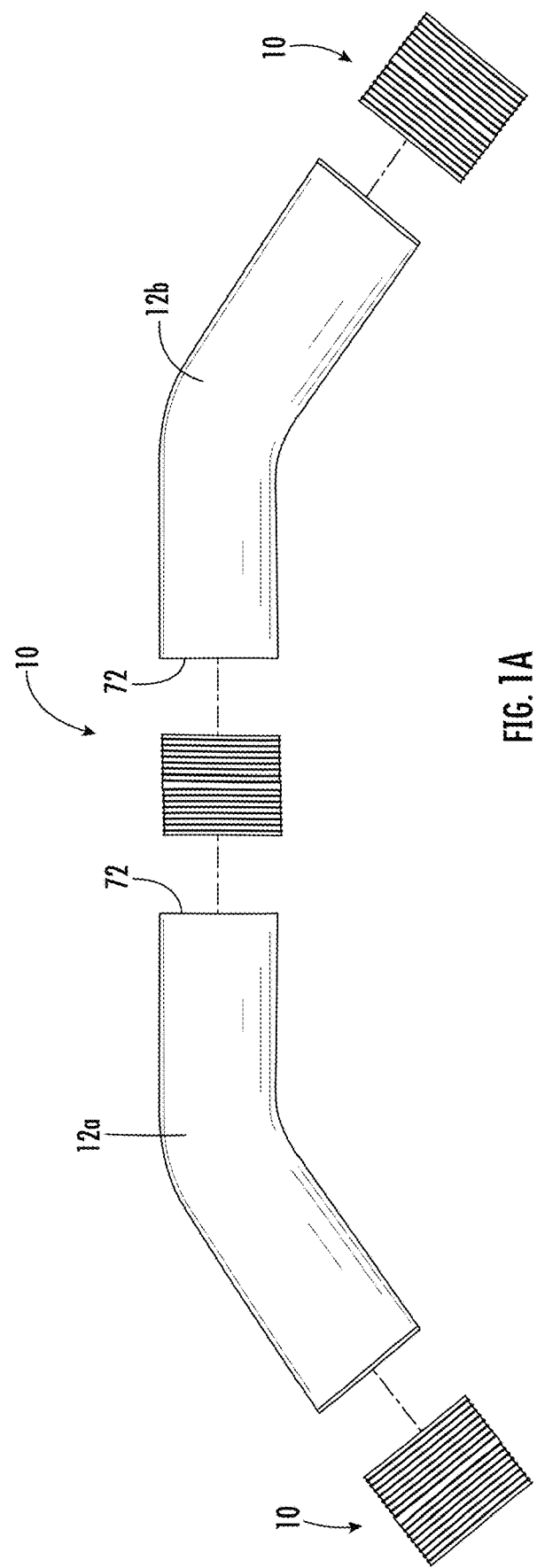

TUBING COUPLER

CROSS-REFERENCE TO RELATED APPLICATIONS

The present application is a divisional of U.S. Patent Application having U.S. Ser. No. 17/831,567, filed Jun. 3, 2022, now U.S. Pat. No. 12,031,616, which claims the benefit of U.S. Provisional Application having U.S. Ser. No. 63/196,287, filed Jun. 3, 2021, which claims the benefit under 35 U.S.C. 119 (e). The disclosure of which is hereby expressly incorporated herein by reference.

STATEMENT REGARDING FEDERALLY SPONSORED RESEARCH OR DEVELOPMENT

Not applicable.

BACKGROUND OF THE DISCLOSURE

1. Field of the Invention

The present disclosure relates to a tubing coupler to secure tubes together to fabricate various parts from the tubing. The disclosure also relates to a method of joining pieces of tubing with the tubing coupler.

2. Description of the Related Art

Typically, when customized parts are made from carbon fiber, the cost for these parts are expensive. Carbon fiber tubing is readily available in various standard lengths, which makes it hard to create a customized part from carbon fiber tubing. Current coupling devices for carbon tubing are structural couplers only, and do not account for situations where a liquid, air or gas will be flowing through the customized part made from carbon fiber.

Accordingly, there is a need for a tubing coupler that can couple pieces of tubing together without retarding or disrupting the flow of fluid through the customized part.

SUMMARY OF THE DISCLOSURE

The present disclosure is directed toward a tubing coupler. The coupler includes a tubular body and a a stock body portion that is grooveless. The tubing coupler also includes a first engagement end with a first set of grooves disposed thereon to engage with an inside portion of a first piece of tubing.

The present disclosure is also directed to a method of making a customized part with the tubing coupler. The method includes securing at least a portion of the tubing coupler inside a first piece of carbon fiber tubing.

BRIEF DESCRIPTION OF THE DRAWINGS

FIG. 1 is an exploded view of a customized part made of carbon fiber tubing and tubing couplers constructed in accordance with the present disclosure.

FIG. 1A is an exploded view of the customized part shown in FIG. 1.

DETAILED DESCRIPTION OF THE DISCLOSURE

Figure 2A:
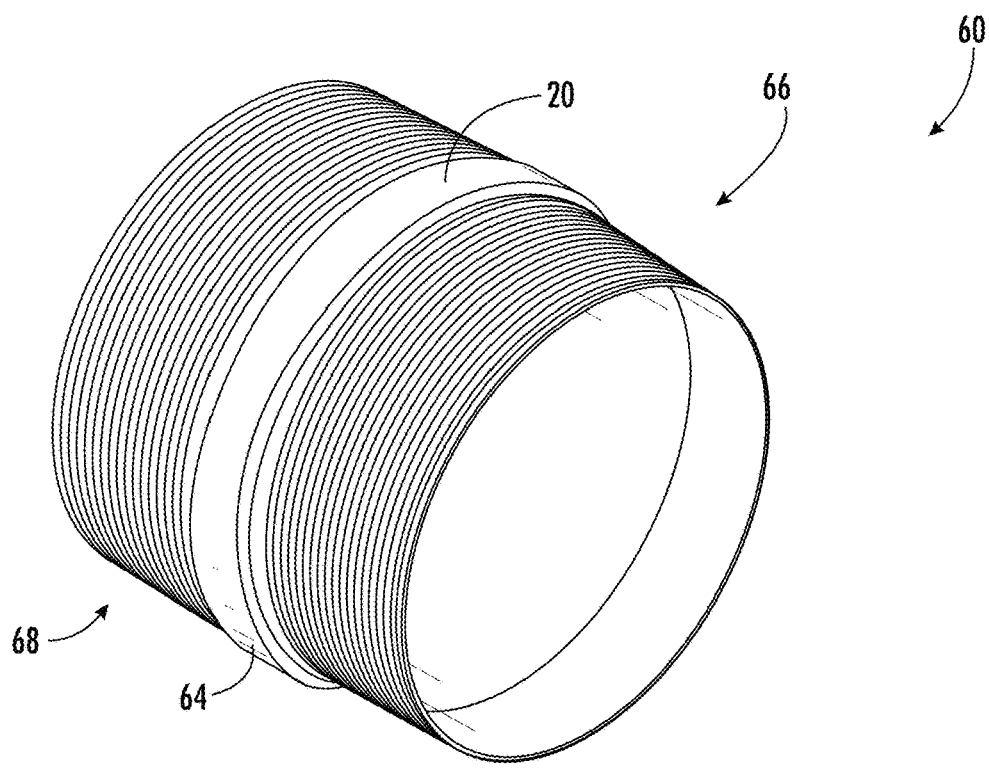
FIGS. 2A-2C are various views of one embodiment of a tubing coupler constructed in accordance with the present disclosure.

Referring now to FIGS. 1-4, the present disclosure relates to a tubing coupler 10 for securely joining two pieces of tubing 12 without retarding or disrupting the flow of fluid, which can be a liquid, air or gas, through a customized part created from the pieces of tubing 12 and at least one tubing coupler 10. The tubing coupler 10 can be used on any tubing constructed of any material known in the art. In an exemplary embodiment, the tubing coupler 10 is a carbon fiber tubing coupler 10 used to create a customized part from pieces of carbon fiber tubing 12. In one embodiment, the carbon fiber tubing coupler 10 includes a tubular body 14 that can have a first engagement end 16 that can engage with a first piece of carbon fiber tubing 12a, a second engagement end 18 that can engage with a second piece of carbon fiber tubing 12b, and a stock body portion 20 that extends between the first and second engagement ends 16 and 18 that does not engage the carbon fiber tubing 12. The tubular body 14 can be any shape such that a desired shaped customized part can be created. For example, the tubular body 14 can be straight, helical, elbow (any degree bend between 0 degrees and 180 degrees), u-shaped, etc. In a further embodiment, the tubular body 14 can also include more than two engagement ends 16 and 18. For example, the tubular body 14 could have an E-shape or, a reducer/expander shape where the carbon fiber tubing coupler 10 has one inlet and multiple outlets or multiple inlets and one outlet. It should be understood and appreciated that the carbon fiber tubing coupler 10 can have any number of inlets and outlets. It should also be understood and appreciated that all inlets and outlets can have an engagement end.

Referring now to FIGS. 3A-3D, the first engagement end 16 of the carbon fiber tubing coupler 10 includes a grooved portion 22 disposed in an outer surface 24. The grooved portion 22 can have grooves 26 disposed at least partially around the circumference of the first engagement end 16. The grooved portion 22 can extend a certain axial length from a terminal end 28 of the first engagement end 16. The grooves 26 can have a certain depth from the outer surface 24 of the tubular body 14. The grooves 26 are disposed between ridges 30. The ridges 30 can have a height that is equivalent to the depth of the grooves 26. In one embodiment, a portion of the ridges 30 can have a descending height to create a tapered diameter portion 32 of the grooved portion 22 of the first engagement end 16 of the tubular body 14. In a further embodiment, the inside portion 34 of the first engagement end 16 adjacent to the first terminal end 28 can include a beveled end 36 that is tapered such that the terminal end 28 is thinner than the thickness of the sidewall 38 of the tubular body 14. The thinner terminal end 34 helps to prevent the disturbance of fluid flowing through the customized part.

In one embodiment, the grooved portion 22 can include at least one break portion 40 where there are no ridges or grooves. The break portions 40 can be at least partially axially directed, can extend any desired length of the grooved portion 22 of the first engagement end and have any desired width. The break portions 40 can also have varying widths and varying paths. For example, the path of the break portions 40 can be linear or nonlinear. In a further embodiment, the break portion 40 can be angled relative to the terminal end 28 of the first engagement end 16.

The tapered diameter portion 32 of the grooved portion 22 of the first engagement end 16 where the ridges have a descending height has a certain length that is a percentage of the length of the grooved portion 22 of the first engagement end 16. In one embodiment, the length of the tapered diameter portion 32 of the grooved portion 22 of the first engagement end 16 where the ridges 30 have a descending height is less than 50 percent of the length of the grooved portion 22 of the first engagement end 16. In another embodiment, the length of the tapered diameter portion 32 of the grooved portion 22 of the first engagement end 16 where the ridges 30 have a descending height is less than 40 percent of the length of the grooved portion 22 of the first engagement end 16. In yet another embodiment, the length of the tapered diameter portion 32 of the grooved portion 22 of the first engagement end 16 where the ridges 30 have a descending height is less than 35 percent of the length of the grooved portion 22 of the first engagement end 16. In an even further embodiment, the length of the tapered diameter portion 32 of the grooved portion 22 of the first engagement end 16 where the ridges 30 have a descending height is less than 25 percent of the length of the grooved portion 22 of the first engagement end 16.

The second engagement end 18 of the carbon fiber tubing coupler 10 includes a second grooved portion 42 disposed in the outer surface 24. The second grooved portion 42 can have grooves 44 disposed at least partially around the circumference of the second engagement end 18. The second grooved portion 42 can extend a certain axial length from a second terminal end 46 of the second engagement end 18. The grooves 44 can have a certain depth from the outer surface 24 of the tubular body 14. The grooves 44 are disposed between ridges 48. The ridges 48 can have a height that is equivalent to the depth of the grooves 44. In one embodiment, a portion of the ridges 48 can have a descending height to create a second tapered diameter portion 50 of the second grooved portion 42 of the second engagement end 18 of the tubular body 14. In a further embodiment, the inside portion of the second engagement end 18 adjacent to the second terminal end 46 of the second can include a second beveled part that is tapered such that the second terminal end 46 is thinner than the thickness of the sidewall 38 of the tubular body 14. The thinner terminal end 46 helps to prevent the disturbance of fluid flowing through the customized part.

In one embodiment, the second grooved portion can include at least one break portion where there are no ridges or grooves. The break portions can be at least partially axially directed, can extend any desired length of the second grooved portion of the second engagement end and have any desired width. The break portions can also have varying widths and varying paths. For example, the path of the break portions can be linear or nonlinear. In a further embodiment, the break portion can be angled relative to the second terminal end of the second engagement end.

The second tapered portion 50 of the second grooved portion 42 of the second engagement end 18 where the ridges 48 have a descending height has a certain length that is a percentage of the length of the second grooved portion 42 of the second engagement end. In one embodiment, the length of the second tapered portion 50 of the second grooved portion 42 of the second engagement end 18 where the ridges 48 have a descending height is less than 50 percent of the length of the second grooved portion 42 of the second engagement end 18. In another embodiment, the length of the second tapered portion 50 of the second grooved portion 42 of the second engagement end 18 where the ridges 48 have a descending height is less than 40 percent of the length of the second grooved portion 42 of the second engagement end 18. In yet another embodiment, the length of the second tapered portion 50 of the second grooved portion 42 of the second engagement end 18 where the ridges 48 have a descending height is less than 35 percent of the length of the second grooved portion 42 of the second engagement end 18. In an even further embodiment, the length of the second tapered portion 50 of the second grooved portion 42 of the second engagement end 18 where the ridges 48 have a descending height is less than 25 percent of the length of the second grooved portion 42 of the second engagement end 18.

It should be understood and appreciated that the stock body portion 20 of the tubular body 14 is free of any grooves or ridges. As shown in FIG. 2C, the stock body portion 20 can have any size and/or length desired. It should also be understood that the tubular body 14 can have only one engagement end (see FIG. 4) or more than two engagement ends that can engage with a separate piece of carbon fiber tubing 12 or another part of a piece of carbon fiber tubing and each engagement end can be designed similar to how the first and second engagement ends 16 and 18 are described herein. If only one engagement end is used, the other side of the tubing coupler 10 can be used to be coupled to different types of tubing from carbon fiber.

Figure 2B:
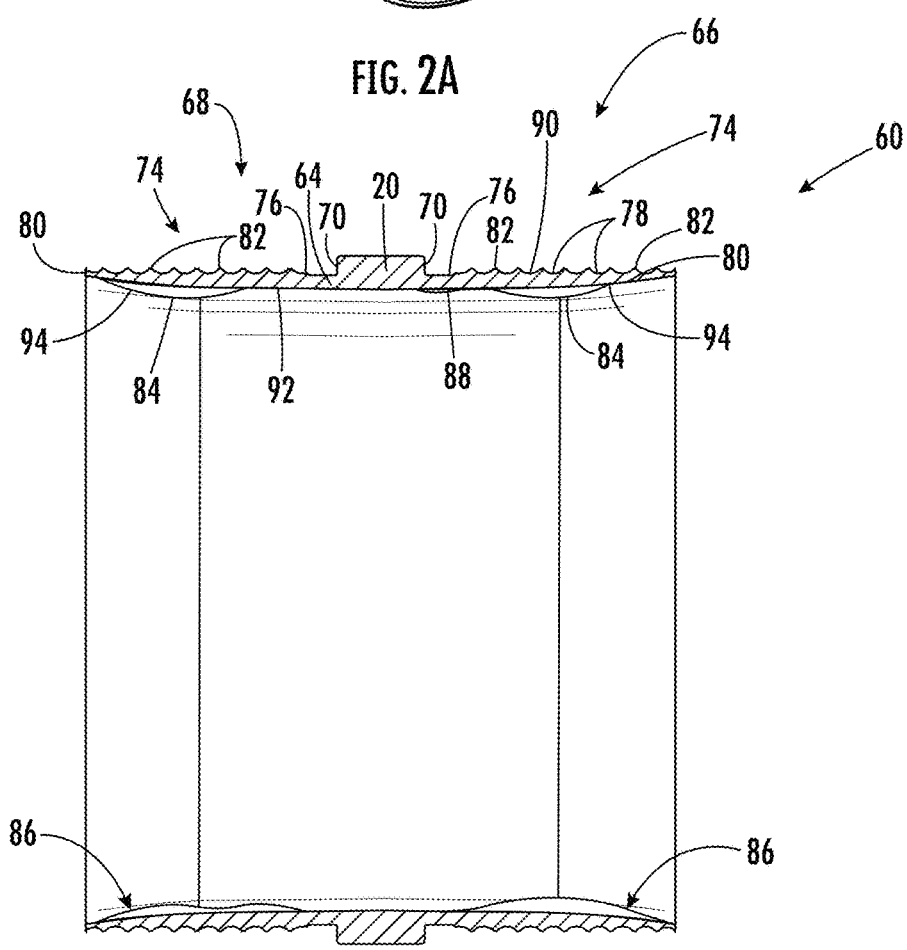
Figure 2C:
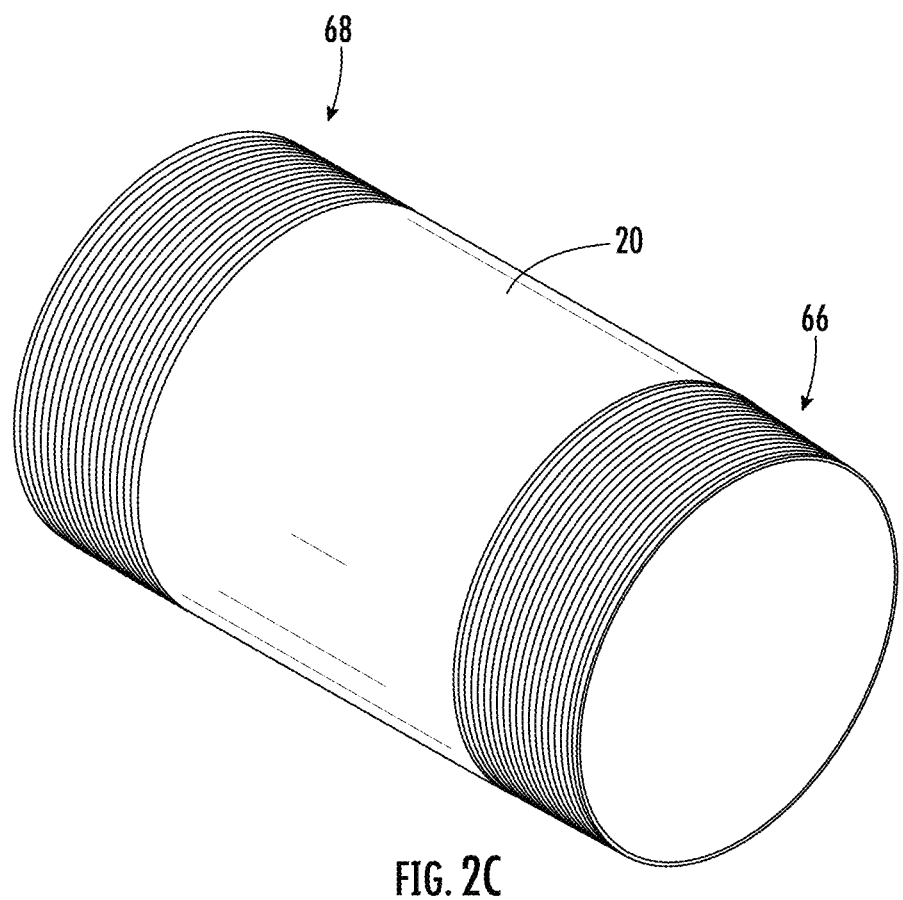
Figure 3A:
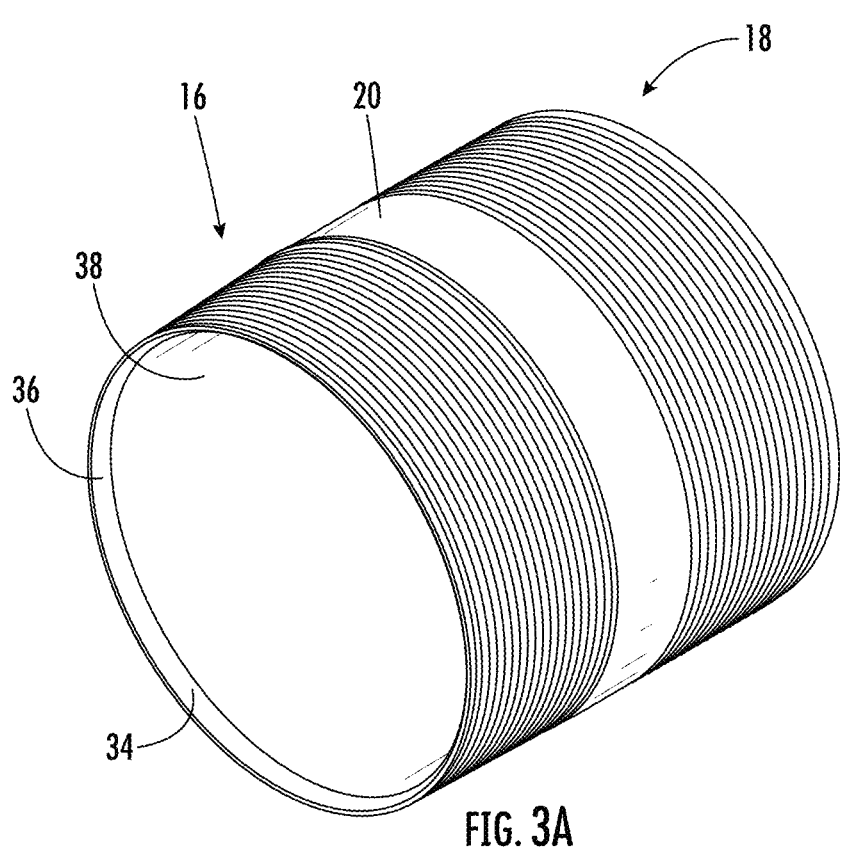
FIGS. 3A-3D various views of another embodiment of the tubing coupler constructed in accordance with the present disclosure.
Figure 3B:
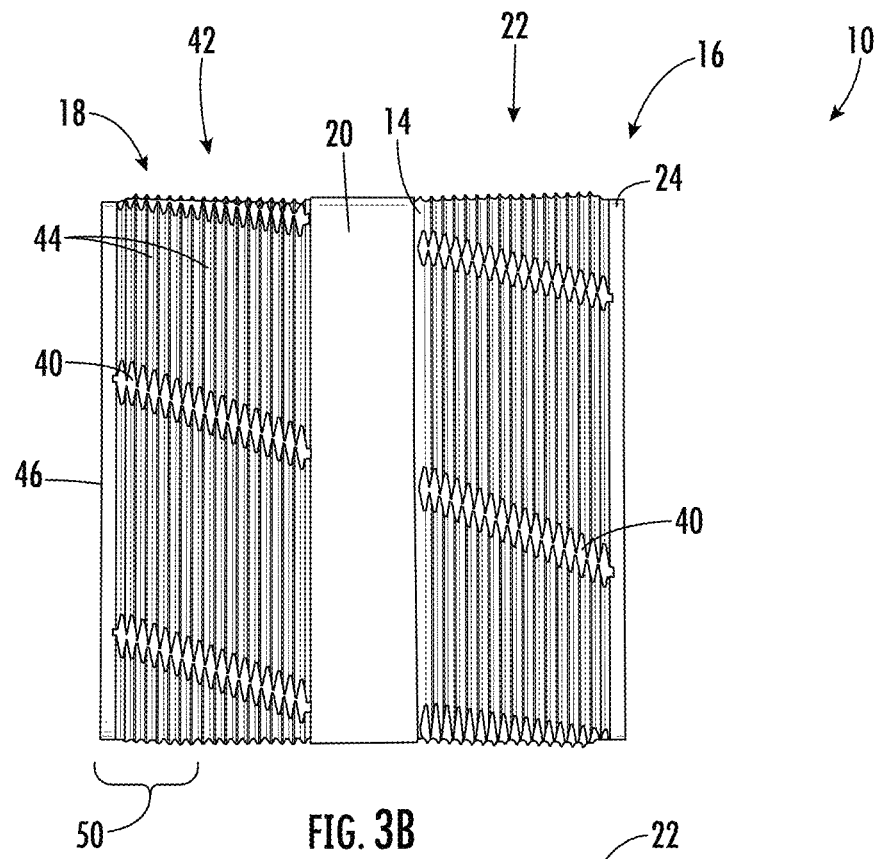
Figure 3C:
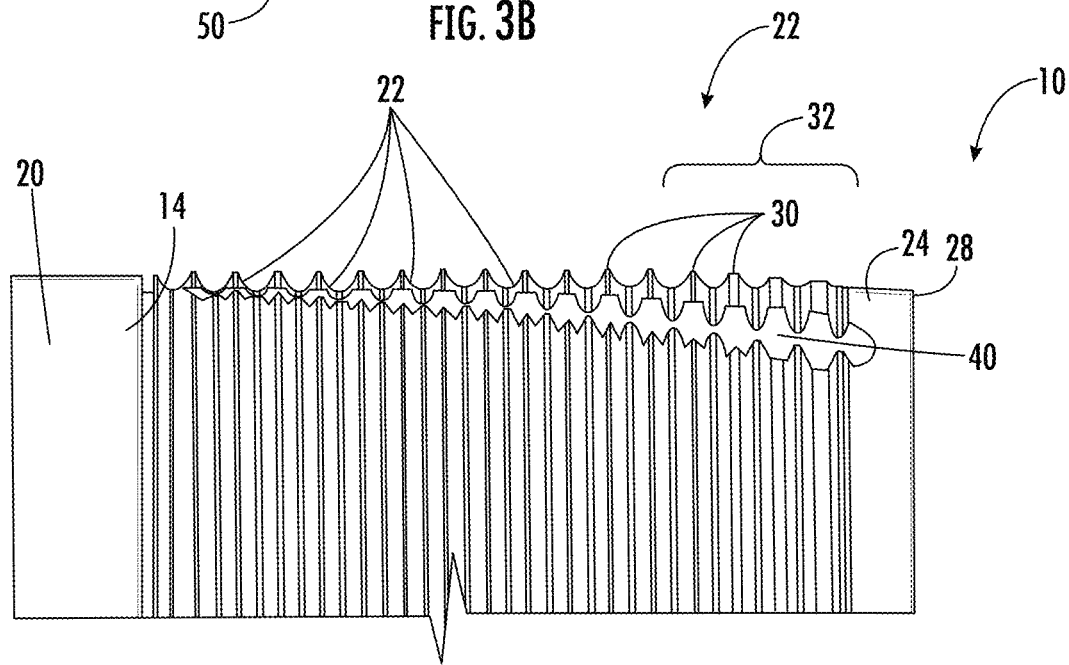
Figure 3D:
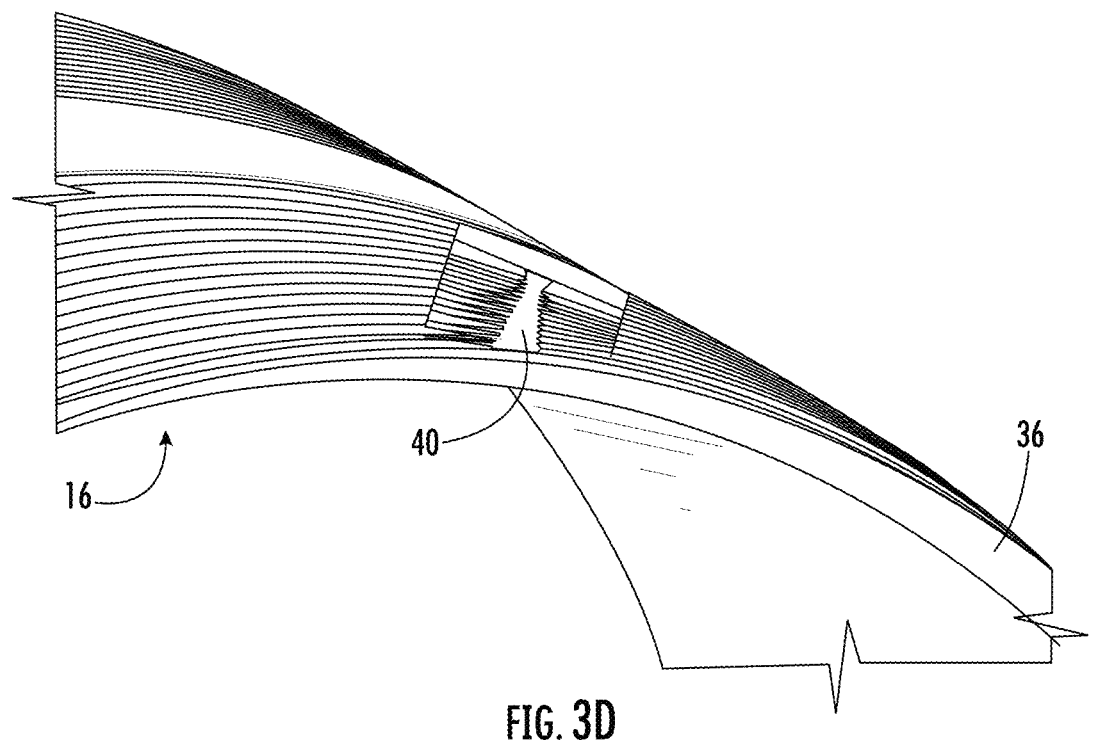
Figure 4:
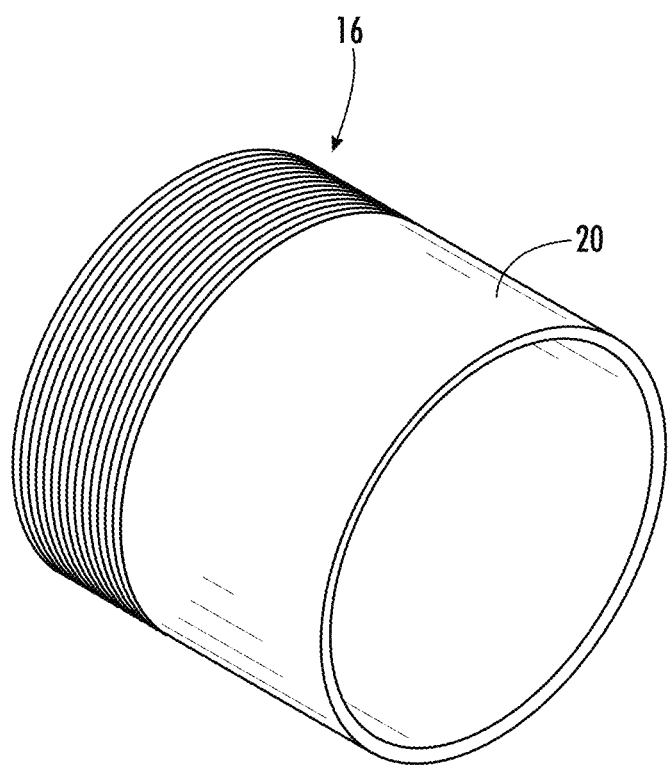
FIG. 4 is a perspective view of yet another embodiment of the tubing coupler constructed in accordance with the present disclosure.

Shown in more detail in FIGS. 2A and 2B, the present disclosure relates to another embodiment of a carbon fiber tubing coupler 60 for securely joining two pieces of carbon fiber tubing 12 without retarding or disrupting the flow of fluid through a customized part created from the pieces of carbon fiber tubing 12 and at least one carbon fiber tubing coupler 60. The carbon fiber tubing coupler 60 includes a tubular body 64 that can have a first engagement end 66 that can engage with a first piece of carbon fiber tubing 12, a second engagement end 68 that can engage with a second piece of carbon fiber tubing 12, and a shoulder portion 70 that extends between the first and second engagement ends 66 and 68 that provides a structure to which the ends 72 of the carbon fiber tubing pieces 62 can abut. The height of the shoulder portion 70 can vary depending up on the sidewall thickness of the carbon fiber tubing 62 used to make the customized part.

The first engagement end 66 of the carbon fiber tubing coupler 60 includes a grooved portion 74 disposed in an outer surface 76 of the tubular member 60. The grooved portion 74 can have grooves 78 disposed at least partially around the circumference of the first engagement end 66. The grooved portion 74 can extend a certain axial length from a terminal end 80 of the first engagement end 66. The grooves 78 can have a certain depth from the outer surface 76 of the tubular body 60. The grooves 78 are disposed between ridges 82. The ridges 82 can have a height that is equivalent to the depth of the grooves 78. In one embodiment, the grooves 78 have a rounded bottom and the ridges 82 are more aggressively angled so as to better engage with the inside of the carbon fiber tubing 62.

In one embodiment, the inside 84 of the tubular member 64 adjacent to the terminal end 80 of the first engagement end 66 can have a tapered inside portion 86 that can is tapered such that the terminal end 80 is thinner than the thickness of the sidewall 88 of the tubular body 64. The sidewall 88 of the tubular body 64 in this embodiment being the distance from the bottom 90 of the grooves 78 to the inside 84 of the tubular body 64. In a further embodiment, the tapered inside portion 86 of the terminal end 80 is a rounded tapering. Furthermore, the thickness of the sidewall 88 of the carbon fiber tubing coupler 60 can be thinner in a central portion 92 than it is at one point between the terminal end 80. So, the thickness of the sidewall 88 of the carbon fiber tubing coupler 60 is smallest at the terminal end 80 and increases across the rounded tapered portion 86, until it reaches a max thickness, and then tapers down a small amount as the inside of the carbon fiber tubing coupler 60 approaches the central portion 92. The tapering on both sides of the max thickness causes a Bernoulli Effect on the fluid flowing through the customized part, which can increase the velocity of the fluid flowing through the customized part. Additionally, the thinner terminal end 80 helps to prevent the disturbance of fluid flowing through the customized part.

The part of the rounded tapered portion 86 of the inside of the first engagement end 66 between the max thickness and the terminal end 80 (an outer tapered portion 94) can have a certain length that is a function of the length of the grooved portion 74 of the first engagement end 66. In one embodiment, the length of the outer tapered portion 94 is about 50 percent of the length of the grooved portion 74. In another embodiment, the length of the outer tapered portion 94 is about 45 percent of the length of the grooved portion 74. In a further embodiment, the length of the outer tapered portion 94 is about 40 percent of the length of the grooved portion 74. It should be understood and appreciated that the second engagement end 68 of the carbon fiber tubing coupler 60 can be designed similarly to the first engagement end 66. Said in another way, the second engagement end 68 can have a geometry that mirrors that described for the first engagement end 66.

The grooves 78 on the engagement ends 66 and 68 of the coupler 60 increases the surface area that the adhesive is applied to. In one embodiment, the grooves 78 increase the surface area by more than 35 percent. In another embodiment, the grooves 78 increase the surface area by more than 30 percent. In a further embodiment, the grooves 78 increase the surface area by more than 25 percent. In yet another embodiment, the grooves 78 increase the surface area by more than 15 percent.

In another embodiment of the present disclosure, the grooves 78 can be spiraled around the engagement ends 66 and 68 of the tubing coupler 60. When the grooves 78 are spiraled around the engagement ends 66 and 68, the grooves 78 are essentially comprised of one long continuous groove. The spiraled grooves 78 are designed so that the adhesive is evenly distributed and as a result. It eliminates the natural tendency for the adhesive to form into voids, air pockets, and/or pathways thereby creating a superior joint for fluid transfer systems. Furthermore, spiraled arrangement of the grooves 78 creates a long path that makes it virtually impossible for a passageway (or leak) to be inadvertently created in the adhesive while still in its liquid form. Once the adhesive hardens in between the grooves 78 on the engagement ends 66 and 68 of the coupler 60 and the ID of the tubing 62, it is mechanically locked or wedged in place. Simultaneously, an extremely strong chemical bond is formed between the two surfaces, which is also made stronger by the even distribution of the adhesive mentioned above.

The present disclosure is also directed to a method of creating a customized part from at least one piece of carbon fiber tubing 12 or 62 and the carbon fiber tubing coupler 10 or 60 described herein, or joining at least two pieces of carbon fiber tubing 12 or 62 with the carbon fiber tubing coupler 10 or 60. The inside of a piece of carbon fiber tubing 12 or 62 can be scored or abraded to cause scratches in the inside of the piece of carbon fiber tubing 12 or 62. An adhesive can then be applied to the grooves 78 of the carbon fiber tubing coupler 10 or 60 or to the inside of the piece of carbon fiber tubing. After the adhesive is applied, one end of the carbon fiber tubing coupler 60 can be inserted into the end of the piece of carbon fiber tubing. It should be understood and appreciated that any embodiment described herein for the tubing coupler 10 or 60 can be combined with any other embodiment described herein.

From the above description, it is clear that the present disclosure is well-adapted to carry out the objectives and to attain the advantages mentioned herein as well as those inherent in the disclosure. While presently preferred embodiments have been described herein, it will be understood that numerous changes may be made which will readily suggest themselves to those skilled in the art and which are accomplished within the spirit of the disclosure and claims.

What is claimed is:

1. A method of making a customized part, the method comprising:
   securing at least a portion of a tubing coupler inside a first piece of carbon fiber tubing, the tubing coupler comprises:
      a tubular body;
      a stock body portion that is grooveless; and
      a first engagement end with a first set of grooves disposed thereon to engage with an inside portion of a first piece of tubing, the first set of grooves has a sidewall thickness, the sidewall thickness is greater at a central portion of the first set of grooves than the sidewall thickness of the first set of grooves adjacent to the stock body portion and greater than the sidewall thickness of the first set of grooves between the central portion and a terminal end of the first engagement end.

2. The method of claim 1 further comprising securing a second piece of carbon fiber tubing around another portion of the tubing coupler.

3. The method of claim 1 further comprising a second engagement end with a second set of grooves disposed thereon to engage with an inside portion of a second piece of tubing.

4. The method of claim 3 wherein the first engagement end includes a first beveled portion adjacent to a terminal end of the first engagement end and the second engagement end includes a second beveled portion adjacent to a terminal end of the second engagement end.

5. The method of claim 3 wherein a depth of the first set of grooves in the first engagement end descends as the grooves approach the terminal end of the first engagement end, heights of a first set of ridges created by the first set of grooves descend as the first set of ridges approach the terminal end of the first engagement end, a depth of the second set of grooves in the second engagement end descends as the grooves approach the terminal end of the second engagement end, and heights of a second set of ridges created by the second set of grooves descend as the second set of ridges approach the terminal end of the second engagement end.

6. The method of claim 3 wherein the first set of grooves and the second set of grooves include a break portion.

7. The method of claim 3 wherein the second set of grooves has a sidewall thickness, the sidewall thickness is greater at a central portion of the second set of grooves than the sidewall thickness of the second set of grooves adjacent to the stocky body portion and greater than the sidewall thickness of the second set of grooves between the central portion and a terminal end of the second engagement end.

8. The method of claim 7 wherein the first engagement end includes a rounded tapered portion that extends from the central portion of the first set of grooves to the terminal end of the first engagement end.

9. The method of claim 8 wherein the second engagement end includes a rounded tapered portion that extends from the central portion of the second set of grooves to the terminal end of the second engagement end.

* * * * *